United States Patent
Thiele et al.

(10) Patent No.: US 6,938,941 B2
(45) Date of Patent: Sep. 6, 2005

(54) TAILGATE DUAL MODE HINGE WITH INTEGRATED CHECKER

(75) Inventors: Steven Thiele, Marysville, OH (US); Kenichi Kitayama, Dublin, OH (US); Marc Lamarre, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/663,581

(22) Filed: Sep. 16, 2003

(65) Prior Publication Data

US 2005/0057063 A1 Mar. 17, 2005

(51) Int. Cl.⁷ .......................................... B62D 33/037
(52) U.S. Cl. ................. 296/50; 296/57.1; 296/146.12; 49/192; 16/334
(58) Field of Search ................... 296/50, 57.1, 146.11, 296/146.12; 49/192; 16/85, 225, 308, 334

(56) References Cited

U.S. PATENT DOCUMENTS

| | | | |
|---|---|---|---|
| 3,370,317 A | 2/1968 | Marchione | |
| 3,387,406 A | 6/1968 | Coker et al. | |
| 3,400,974 A * | 9/1968 | Gage | 295/146.12 |
| 3,431,588 A | 3/1969 | Frey | |
| 3,567,274 A | 3/1971 | Kaptur, Jr. et al. | |
| 3,592,504 A * | 7/1971 | Sandor | 296/70 |
| 3,623,764 A * | 11/1971 | Jacobus | 296/50 |
| 3,729,772 A | 5/1973 | Marchione | |
| 3,870,361 A | 3/1975 | Krause | |
| 3,905,064 A | 9/1975 | Brockhaus | |
| 4,076,301 A * | 2/1978 | Gergoe | 296/50 |
| 4,285,098 A | 8/1981 | Hicks et al. | |
| 4,380,848 A | 4/1983 | Guionie et al. | |
| 4,536,918 A | 8/1985 | Brockhaus | |
| 4,617,712 A | 10/1986 | Streett | |
| 4,672,715 A | 6/1987 | Beckwith | |
| 4,700,983 A | 10/1987 | Kinaga et al. | |
| 4,932,101 A | 6/1990 | Lualdi | |
| 5,226,202 A | 7/1993 | Griffins | |
| 5,235,726 A | 8/1993 | Geier, Jr. et al. | |
| 5,398,987 A * | 3/1995 | Sturgis | 296/37.6 |
| 5,575,037 A | 11/1996 | Tolle et al. | |
| 5,675,869 A | 10/1997 | Lotz | |
| 5,791,017 A | 8/1998 | Klüuting | |
| 5,794,309 A | 8/1998 | Lotz | |
| 6,148,481 A | 11/2000 | Chen | |
| 6,676,196 B1 * | 1/2004 | Smith | 296/57.1 |
| 6,742,826 B2 * | 6/2004 | Humphrey et al. | 296/57.1 |

(Continued)

Primary Examiner—Lori L. Coletta
(74) Attorney, Agent, or Firm—Fay, Sharpe, Fagan, Minnich & McKee, LLP

(57) ABSTRACT

A vehicle load-carrying bed includes a generally rectangular bed floor. A front wall extends upwardly adjacent a front edge of the bed floor. A first side wall extends upwardly adjacent a first side edge of the bed floor. A second side wall extends upwardly adjacent a second, opposite side edge of the bed floor. A tailgate is positioned along a rear edge of the bed floor and extends between the first and second sidewalls. A dual axis hinge pivotally connects the tailgate to the first side wall for movement about a first axis generally parallel with the rear edge of the bed floor and alternative movement about a second axis generally parallel with a vertical bed edge of the first side wall. The hinge includes a checker for urging the tailgate into preselected positions when the tailgate is moved about the second axis.

23 Claims, 3 Drawing Sheets

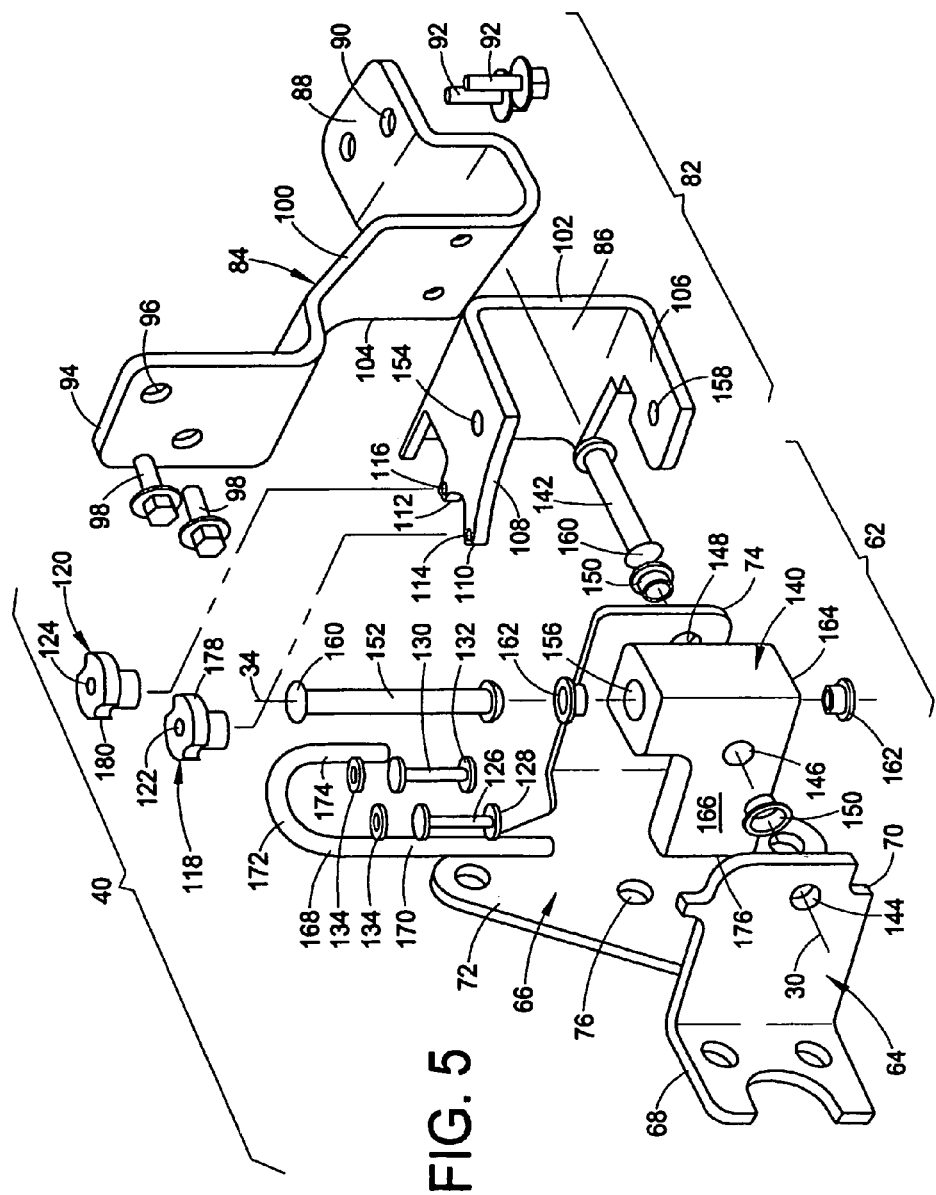

TAILGATE DUAL MODE HINGE WITH INTEGRATED CHECKER

BACKGROUND OF THE INVENTION

1. Field of the Invention

The present invention relates to a tailgate for a vehicle. More particularly, the present invention relates to a dual-mode tailgate having an improved dual mode hinge with an integrated checker. The present invention finds particular application as a dual mode hinge on a pick-up truck tailgate and will be described with particular reference thereto. However, it is to be appreciated that the invention may relate to other similar environments and applications.

2. Description of the Prior Art

Dual-mode tailgates are generally known. For example, U.S. Pat. No. 3,387,406 issued to Coker discloses a dual-mode tailgate for use on a station wagon. "Dual-mode" refers to the two directions or pivot axes along which a dual-mode tailgate is openable. More particularly, a dual-mode tailgate is selectively openable in a first, fold-down direction about an axis generally parallel with a bottom edge of the tailgate similar to a conventional pick-up truck tailgate. The dual-mode tailgate is also selectively openable in a second, side-to-side direction about an axis generally parallel with a lateral edge of the tailgate.

It has been proposed to include a dual-mode tailgate in a heavy duty vehicle designed to carry large loads and/or heavy load-bearing cargo. For example, a dual-mode tailgate could be employed in a pick-up truck, a hybrid vehicle that includes a pick-up style bed or other similar vehicle. However, heretofore, most dual-mode tailgates were only employed in light duty vehicles such as station wagons, traditional sport utility vehicles (SUVs) and the like. Thus, the prior art dual-mode tailgates are generally not designed to accommodate large loads or load-bearing cargo and are unsuitable for use on vehicles intended to carry heavy loads.

More particularly, the prior art dual-mode tailgates and their functional components are generally not designed to withstand the relatively more severe treatment they will likely endure in a pick-up truck application. In particular, the dual mode hinge assemblies of the prior art lack sufficient strength to be employed in heavy duty applications, including pick-up truck applications. Thus, there is a need for a dual-mode hinge that is strong enough to support the tailgate in its various positions, particularly when a load is applied to the tailgate. Further, it is additionally desirable that any dual mode hinge assembly be relatively easy to manufacture, relatively inexpensive and easy to assemble and install on a vehicle.

It is further desirable to incorporate a checker into a dual-mode tailgate hinge. Heretofore, conventional hinge arrangements having checkers often wear prematurely relative to the life of the hinge. More particularly, many conventional checkers utilized in vehicle door arrangements utilize a sliding engagement between cam surfaces and a related spring mechanism. It is believed that this sliding engagement tends to cause increased wear on the cam surfaces which may have the effect of undesirably reducing the force necessary to overcome the urging of the checker. Thus, there is also a need for a dual mode hinge that has an integrated checker that does not wear prematurely.

SUMMARY OF THE INVENTION

The present invention provides a new and improved dual mode hinge with an integrated checker for use with a dual mode tailgate that overcomes the foregoing difficulties and others and provides the aforementioned and other advantageous features.

In accordance with one aspect of the present invention, a vehicle load-carrying bed is provided. More particularly, in accordance with this aspect of the invention, the vehicle load-carrying bed includes a generally rectangular bed floor. A front wall extends upwardly adjacent a front edge of the bed floor. A first side wall extends upwardly adjacent a first side edge of the bed floor. A second side wall extends upwardly adjacent a second, opposite side edge of the bed floor. A tailgate is positioned along a rear edge of the bed floor and extends between the first and second sidewalls. A dual axis hinge pivotally connects the tailgate to the first side wall for movement about a first axis generally parallel with the rear edge of the bed floor and alternative movement about a second axis generally parallel with a vertical bed edge of the first side wall. The hinge includes a checker for urging the tailgate into preselected positions when the tailgate is moved about the second axis.

According to another aspect of the present invention, a dual mode hinge assembly is provided for use with a dual mode tailgate. More particularly, in accordance with this aspect of the invention, the dual mode hinge assembly includes a body bracket assembly mounted to a sidewall defining a vehicle load-carrying bed. A tailgate bracket assembly is mounted to a tailgate that extends across an open edge of the vehicle load-carrying bed. A first rotatable connection is between the tailgate bracket assembly and the body bracket assembly having a first pivot axis generally parallel with a bottom edge of the tailgate. A second rotatable connection is between the tailgate bracket assembly and the body bracket assembly having a second pivot axis generally parallel with a lateral edge of the tailgate.

According to yet another aspect of the present invention, a tailgate assembly is provided. The tailgate assembly is adapted to be mounted along an open edge of a vehicle's load-carrying bed wherein the tailgate is able to alternatively pivot about (1) an axis generally parallel with a bottom edge of the tailgate for movement between a closed position and a fold-open position and (2) an axis generally parallel with a lateral edge of the tailgate for movement between the closed position and a swing-open position.

In accordance with this aspect of the invention, the tailgate assembly includes a tailgate selectively closing an open end of an associated vehicle load-carrying bed. A dual mode hinge assembly is mounted to the tailgate adjacent a corner of the tailgate formed at an intersection of a bottom edge of the tailgate and a first lateral edge of the tailgate. A first selectively operable hinge is mounted to the tailgate adjacent a corner of the tailgate formed at an intersection of the bottom edge of the tailgate and a second lateral edge of the tailgate. The first selectively operable hinge cooperates with the dual mode hinge assembly to pivotally support the tailgate about a first pivot axis. A second selectively operable hinge is mounted to the tailgate adjacent a corner of the tailgate formed at an intersection of a top edge of the tailgate and the first lateral edge of the tailgate. The second selectively operable hinge cooperates with the dual mode hinge assembly to pivotally support the tailgate about a second pivot axis.

According to still yet another aspect of the present invention, a dual mode hinge assembly is provided for use with a dual mode tailgate. More particularly, in accordance with this aspect of the invention, the dual mode hinge assembly includes a body bracket assembly mounted to a sidewall defining a vehicle load-carrying bed. A tailgate bracket assembly is mounted to a tailgate that extends across an open edge of the vehicle load-carrying bed. A rotatable member is between the body bracket assembly and the tailgate bracket assembly. The rotatable member pivotally connects to the body bracket assembly and pivotally connects to the tailgate bracket assembly. The tailgate bracket assembly and the rotatable member are together moveable relative to the body bracket assembly about a second pivot axis to move the tailgate in a fold-down direction. The tailgate bracket assembly is moveable relative to the rotatable member about a second pivot axis to move the tailgate in a swing-open direction.

BRIEF DESCRIPTION OF THE DRAWINGS

The invention may take form in various components and arrangements of components, and in various steps and arrangements of steps. The drawings are only for purposes of illustrating a preferred embodiment of the invention and are not to be construed as limiting the invention.

FIG. 5 is an exploded perspective view of the dual mode hinge assembly of FIG. 4.

DETAILED DESCRIPTION OF THE INVENTION

Figure 1:
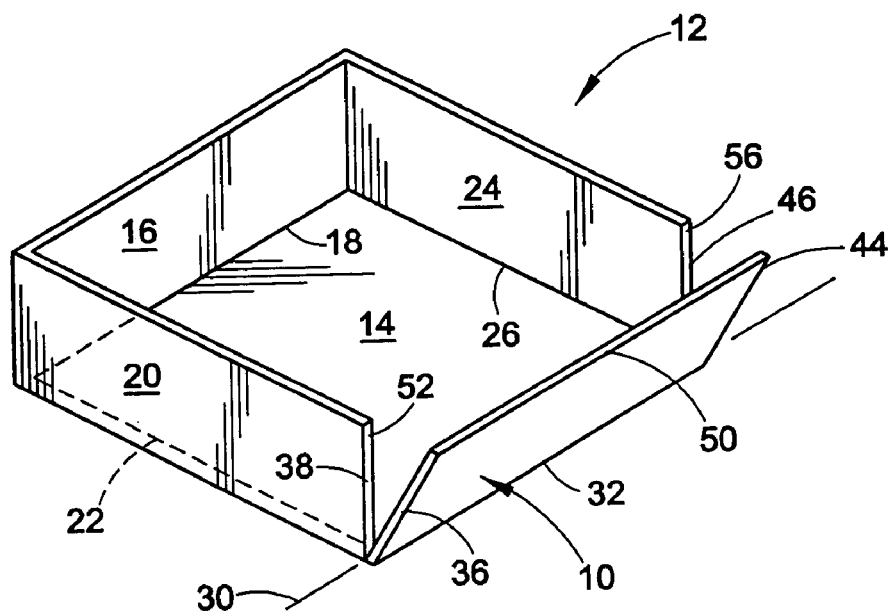
FIG. 1 is a schematic perspective view of a dual-mode pick-up truck tailgate opening in a first, fold-down direction according to a preferred embodiment of the present invention.
Figure 2:
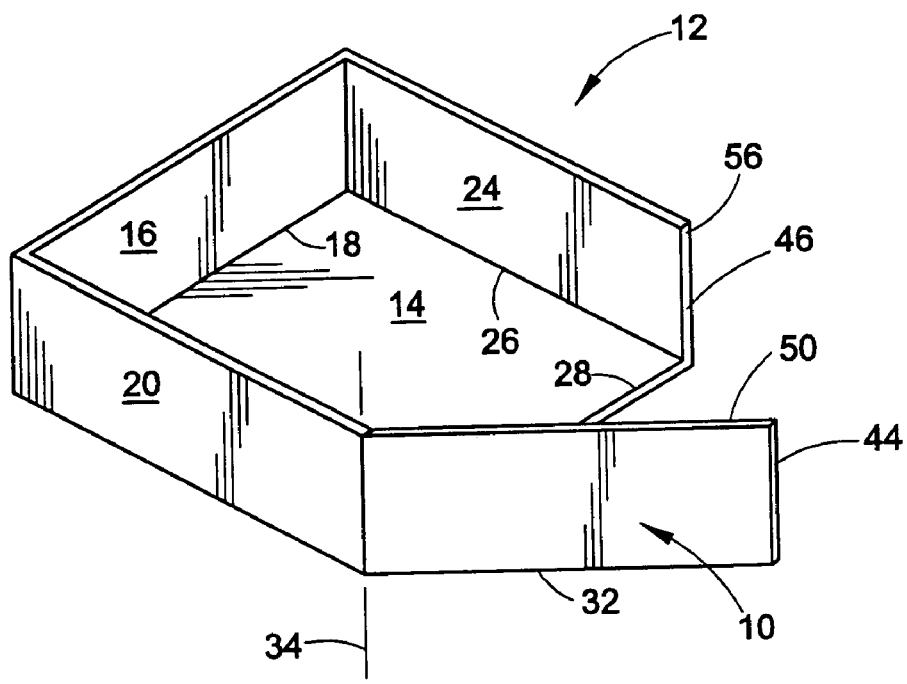
FIG. 2 is a schematic perspective view of the dual-mode pick-up truck tailgate of FIG. 1 opening in a second, side-to-side direction.

Referring now to the drawings wherein the showings are for purposes of illustrating preferred embodiments of the invention only and not for purposes of limiting the same, with reference to FIGS. 1 and 2, a dual-mode tailgate 10 is shown as a component of a vehicle's load-carrying bed 12 according to a preferred embodiment of the present invention. More particularly, the bed 12 includes a generally rectangular bed floor 14 having a plurality of walls extending upwardly adjacent three edges of the floor 14. Specifically, a front wall 16 extends upwardly adjacent a front edge 18 of the bed floor 14. A first side wall 20 extends upwardly adjacent a first side edge 22 of the bed floor 14. A second side wall 24 extends upwardly adjacent a second side edge 26 (opposite the first side edge 22) of the bed floor 14.

The dual-mode or dual-axis tailgate 10 is positioned along an open, rear edge 28 of the bed floor 14. More particularly, the tailgate 10 extends between the first and second sidewalls 20,24 to selectively close an open end of the load-carrying bed 12. With specific reference to FIG. 1, the tailgate 10 is able to pivot about a first horizontal axis 30 for movement between a closed position and a fold-open position. The first axis 30 is generally parallel with the rear edge 28 of the bed floor 14 and a bottom edge 32 of the tailgate 10.

With specific reference to FIG. 2, the tailgate 10 is also alternatively able to pivot about a second vertical axis 34 for movement between the closed position and a swing-open position. The second axis 34 is generally parallel with a first lateral edge 36 of the tailgate and a vertical bed edge 38 of the first side wall 20. In the preferred embodiment, the dual mode tailgate 10 is the tailgate described in the commonly owned, copending U.S. patent application Ser. No. 10/663,138 entitled "Frame Structure For Vehicle Tailgate" filed Sep. 16, 2003 concurrently with this application and expressly incorporated herein by reference.

Figure 3:
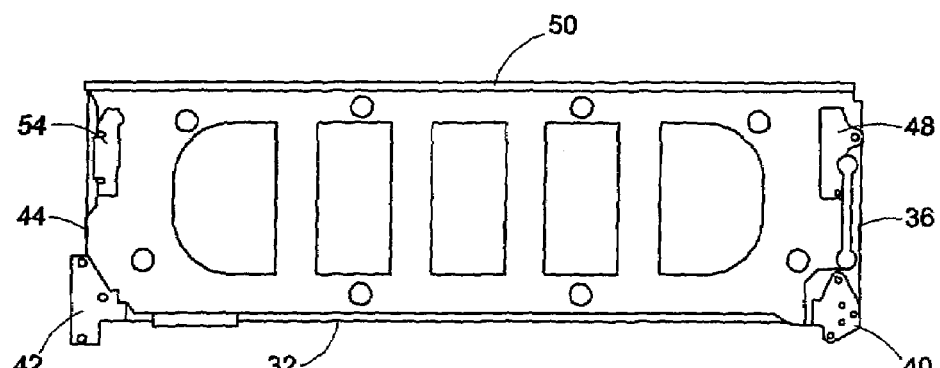
FIG. 3 is an elevational view of the tailgate of FIG. 1 showing an interior side of the tailgate and a dual mode hinge assembly.

To facilitate the dual-mode action of the tailgate 10, with additional reference to FIG. 3, a dual-mode hinge assembly 40 attaches to the tailgate 10 at a corner formed at the intersection of the bottom edge 32 and the first lateral edge 36 of the tailgate 10. The dual-mode hinge assembly 40 pivotally connects the tailgate 10, along the first and second axes 30,34, to the end edge 38 of the first side wall 20 adjacent the rear edge 28 of the bed floor 14. As will be discussed in more detail below, the hinge assembly 40 is strong enough to support the tailgate 10 in its various positions, even when a load is applied to the tailgate 10.

A first selectively operable hinge 42 attaches to the tailgate 10 at a corner formed at the intersection of the bottom edge 32 and a second lateral edge 44 of the tailgate 10. When operable, the first selectively operable hinge 42 pivotally connects the tailgate 10 to a vertical bed edge 46 of the second side wall 24 adjacent the rear edge 28 of the bed floor 14. The first selectively operable hinge 42 cooperates with the dual-mode hinge assembly 40 to pivotally support the tailgate 10 along the first axis 30 when the tailgate 10 is moved between the closed position and the fold-open position.

A second selectively operable hinge 48 attaches to the tailgate 10 at a corner formed at the intersection of the first lateral edge 36 and a top edge 50 of the tailgate 10. When operable, the second selectively operable hinge 48 pivotally connects the tailgate 10 to an upper end 52 of the first sidewall end edge 38. The second selectively operable hinge 48 cooperates with the dual-mode hinge assembly 40 to pivotally support the tailgate 10 along the second axis 34 when the tailgate 10 is moved between the closed position and the swing-open position.

A striker assembly 54 further attaches to the tailgate 10 at a corner formed at the intersection of the top edge 50 and the second lateral edge 44 of the tailgate 10. The striker assembly 54 connects the tailgate 10 to an upper end 56 of the second sidewall end edge 46 when the tailgate 10 is in the closed position.

Figure 4:
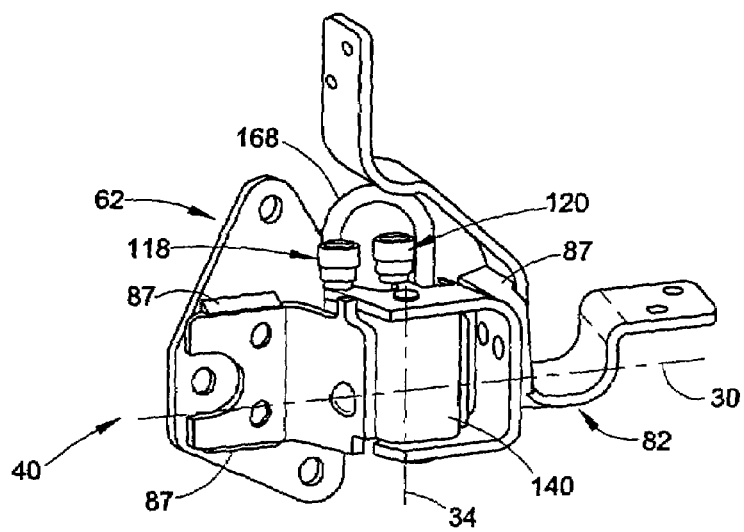
FIG. 4 is an enlarged perspective view of the dual mode hinge assembly of FIG. 3.

With continued reference to FIG. 3 and additional reference to FIGS. 4 and 5, the dual mode hinge assembly 40 includes a body bracket assembly 62 that fixedly mounts to the first sidewall end edge 38 (FIG. 1). The body bracket assembly 62 is formed of a first, generally L-shaped bracket 64 fixedly secured to a second, generally L-shaped bracket 66. More particularly, the first bracket 64 includes a base portion 68 and a first leg portion 70. Similarly, the second bracket 66 includes a base portion 72 and a second leg portion 74.

When mounted together, the leg portions 70,74 and base portion 68 together define a U-shape. The body bracket assembly 62 further includes a plurality of spaced apart holes 76 that receive a plurality of mounting bolts (not shown) for securing the assembly 62 to the end edge 38. Some of holes 76 extend through both brackets 64,66 thereby enabling the brackets 64,66 to be secured to one another when the bracket assembly 62 is mounted to the vehicle at end edge 38. The holes 76 are positioned such that the mounting bolts received therein are oriented in parallel relation to the legs 70,74 of the assembly 62.

The hinge assembly 40 further includes a tailgate bracket assembly 82 that fixedly mounts to the lower corner of the tailgate 10 formed at the intersection of the bottom edge 32 and the first lateral side edge 36. More particularly, the tailgate bracket assembly 82 includes an angled bracket 84 and a generally U-shaped bracket 86 fixedly connected to the angled bracket 84. In the preferred embodiment, the bracket 86 is connected to the bracket 84 by welding 87 (FIG. 4). However, the brackets 84,86 can be alternately connected by riveting, bolting or the like.

The angled bracket 84 includes a first leg portion 88 having throughholes 90 therein that receive bolts 92 for connecting the first leg portion 88 to the bottom side 32 of the tailgate 10. The angled bracket 84 further includes a second leg portion 94 having throughholes 96 therein that receive bolts 98 for connecting the second leg portion 94 to the first lateral side 36 of the tailgate 10. A connecting portion 100 of the angled bracket extends between the first leg portion 88 and the second leg portion 94.

The U-shaped bracket 86 includes a base portion 102 that connects to or is mounted adjacent a vertical section 104 of the connecting portion 100. The vertical section 104 is generally parallel to the first lateral side 36 of the tailgate 10. Additionally, the U-shaped bracket 86 includes a lower arm 106 and an upper arm 108. Both the arms 106,108 extend from the base portion 102 in an orientation generally normal to the first lateral side 36 of the tailgate 10.

The upper arm 108 includes a pair of extending portions, first extending portion 110 and second extending portion 112, formed integrally with the upper arm 108. A first throughhole 114 is provided in the first extending portion 110 and a second throughhole 116 is provided in the second extending portion 112. A first cam 118 is rotatably mounted in the first extending portion 110 and a second cam 120 is rotatably mounted in the second extending portion 112.

More specifically, the first cam 118 includes a throughhole 122 and the second cam 120 includes a throughhole 124. A first pin 126 extends through the aligned throughholes 114,122 to rotatably mount the first cam 118 to the upper arm 108. The first pin 126 includes heads 128 at both ends thereof for securing the pin 126 to the first cam 118 and the upper arm 108. Similarly, a second pin 130 extends through the aligned throughholes 116,124 to rotatably mount the second cam 120 to the upper arm 108. Like the first pin 126, the second pin 130 includes heads 132 at both ends thereof for securing the pin 130 to the second cam 120 and the upper arm 108. Washers 134 are annularly disposed on the pins 126,130 between respective cams 118,120 and pin heads 132 for smoothing the relative relation between the cams 118, 120 and the pins 126,130.

The hinge assembly 40 further includes a rotatable member 140 pivotally connected to the body bracket assembly 62 about the first axis 30 and pivotally connected to the tailgate bracket assembly 82 about the second axis 34. More specifically, a horizontal pivot pin or pintle 142 rotatably connects the rotatable member 140 to the body bracket assembly 62. The horizontal pin 142 is received in a throughhole 144 defined in the first leg portion 70, a throughhole 146 defined in the rotatable member 140 and a throughhole 148 defined in the second leg portion 74. The pin 142 includes heads 160 at both ends thereof to secure the pin 142 between the leg portions 70,74. Optionally, bearings 150 can be employed between the pin 142 and, respectively, the leg portions 70,74. The horizontal pin 142 allows the rotatable member 140, the tailgate bracket assembly 62 and the tailgate 10 connected thereto to rotate relative to the body bracket assembly 62 and the sidewall 20 which remain stationary during pivoting of the tailgate 10 about the second axis 34.

A vertical pivot pin or pintle 152 rotatably connects the rotatable member 140 to the tailgate bracket assembly 82. The vertical pin 152 is received in a throughhole 154 defined in the upper arm 108, a throughhole 156 defined in the rotatable member 140 and a throughhole 158 defined in the lower arm 106. Like the horizontal pin 142, the vertical pin 152 includes heads 160 at both ends thereof to secure the pin 152 between the arms 106,108. Again, optionally, bearings 162 can be employed between the pin 152 and, respectively, the arms 106,108. The vertical pin 152 allows the tailgate bracket assembly 62 and the tailgate 10 connected thereto to rotate relative to the rotatable member 140, the body bracket assembly 62 and the sidewall 20 which all remain stationary during pivoting of the tailgate 10 along the first axis 30.

The rotatable connections between the rotatable member 140 and the brackets 62,82 are described according to the preferred embodiment of the invention. These types of rotatable connections employed in hinges are generally longer lasting, easier to manufacture and easier to install than other types of rotatable connections. However, it is contemplated that other rotatable connections, such as for example ball bearing-type rotatable connections, could be used and are to be considered within the scope of the present invention.

The rotatable member 140 includes a body portion 164 and an arm portion 166 extending from the body portion 164. The body portion 164 is generally cylindrical, although not necessarily circular in cross-section. In particular, the body portion 164 includes a generally flat section adjacent the first leg portion 70. The U-shape of the body bracket assembly 62 and the U-shape of the tailgate bracket assembly 82 cooperate with the cross-section of the body portion 164 and the flat section to limit simultaneous pivotal movement of the tailgate about the first pivot axis 30 and the second pivot axis 34.

The throughhole 156 extends through the body portion 164 along a longitudinal extent thereof. The throughhole 146 extends through the body portion 164 in an orientation generally normal to the throughhole 156 and offset from throughhole 156 such that the throughholes 146,156 do not intersect. The arm portion 166 extends in a direction generally perpendicular to both throughholes 146,156 and attaches to the body portion 164 at a location generally adjacent the throughhole 146.

A biasing member 168 is fixedly secured to the rotatable member 140. More particularly, the biasing member is a candy-cane shaped torsion spring having long portion 170, a curved portion 172 and a short portion 174 parallel to the long portion 170. The long portion 170 is firmly affixed or attached to a distal end 176 of the rotatable member arm portion 166. As will be described in more detail below, the short portion 174 is positioned to be engaged by the rotatable first and second cams 118,120 when the tailgate 10 is opened and/or closed in the side-to-side direction, i.e., about the second pivot axis 34.

More specifically, the short portion 174 has a generally round cross-section that is engaged by cam surfaces 178,180 of the first and second cams 118,120. The cam surfaces 178,180 are generally parallel with the second vertical axis 34. The engagement between the short portion 174 and the cam surfaces 178,180 of the rotatably mounted cams 118, 120 provides an integrated checker to the hinge assembly 40 when used for pivotally opening the tailgate along the second axis 34.

As is known to those skilled in the art, the cam surfaces 178,180 can be shaped such that engagement with the short portion 174 of the torsion spring 168 (1) urges the tailgate 10 into specific predetermined or preselected positions or checkpoints when the tailgate 10 is opened/closed in the side-to-side direction about the second pivot axis 34, (2) maintains the tailgate 10 in one of said specific predetermined positions until a predetermined force is applied to the tailgate 10 to overcome the urging of the torsion spring 168 and/or (3) limits rapid or fast opening and closing of the tailgate 10 about the second pivot axis 34.

The rotatability of the cams 118,120 reduces wear on the cam surfaces 178,180 over the life of the hinge assembly 40. The rotatable arrangement between the cams 118,120 and the torsion spring 168 on the dual mode tailgate 10 has a longevity greater than many conventional door checker arrangements, particularly those that utilize a sliding motion between cam surfaces and a corresponding spring. It should be appreciated that other specific checker arrangements than the preferred embodiment herein described can be utilized in the present invention and all such arrangements are to be considered within the scope of the present invention. For example, three or more rotatable cams could be used.

The dual mode hinge assembly 40 described in reference to the preferred embodiment utilizes a design having components that are relatively easy and inexpensive to manufacture and assemble. For example, the components of the hinge assembly 40 include primarily stamped and/or welded components. Further, the use of bolts for connecting the body bracket assembly 62 to the sidewall 20 and for connecting the tailgate bracket assembly 82 to the tailgate 10 enables relatively easy assembly of the tailgate to an associated vehicle. This, in contrast to prior art tailgates, allows the tailgate to be assembled separately from the vehicle and attached to the vehicle after both the tailgate and the vehicle have already been subassembled.

The invention has been described with reference to the preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

Having thus described the preferred embodiments, the invention is now claimed to be:

1. A vehicle load-carrying bed comprising:
   a bed floor;
   a front wall extending upwardly adjacent a front edge of the bed floor;
   a first side wall extending upwardly adjacent a first side edge of the bed floor;
   a second side wall extending upwardly adjacent a second, opposite side edge of the bed floor;
   a tailgate positioned along a rear edge of the bed floor and extending between the first and second sidewalls;
   a dual axis hinge pivotally connecting the tailgate to the first side wall for movement about a first axis and alternative movement about a second axis approximately normal relative to the first axis, the hinge including a checker for urging the tailgate into preselected positions when the tailgate is moved about the second axis;
   the dual axis hinge including:
     a body bracket assembly connected to the first sidewall, and
     a tailgate bracket assembly connected to the tailgate, the tailgate bracket assembly pivotally connected to the body bracket assembly about the first axis and pivotally connected to the body bracket assembly about the second pivot axis, the tailgate bracket assembly includes an angled bracket with a first leg portion for connecting to the bottom edge of the tailgate and a second leg portion for connecting to the first lateral edge of the tailgate.

2. A vehicle load-carrying bed comprising:
   a bed floor;
   a front wall extending upwardly adjacent a front edge of the bed floor;
   a first side wall extending upwardly adjacent a first side edge of the bed floor;
   a second side wall extending upwardly adjacent a second, opposite side edge of the bed floor;
   a tailgate positioned along a rear edge of the bed floor and extending between the first and second sidewalls;
   a dual axis hinge pivotally connecting the tailgate to the first side wall for movement about a first axis and alternative movement about a second axis approximately normal relative to the first axis; and
   a checker disposed on the hinge for urging the tailgate into preselected positioned when the tailgate is moved about the second axis, the checker includes a torsion spring and at least one rotatable cam for engagement with the torsion spring when the tailgate is opened in the swing-open direction.

3. A dual mode hinge assembly for use with a dual mode tailgate, the dual mode hinge assembly comprising:
   a body bracket assembly mounted to a sidewall defining a vehicle load-carrying bed;
   a tailgate bracket assembly mounted to a tailgate that extends across an open edge of the vehicle load-carrying bed;
   a first rotatable connection between the tailgate bracket assembly and the body bracket assembly having a first pivot axis enabling the tailgate to flip-open;
   a second rotatable connection between the tailgate bracket assembly and the body bracket assembly having a second pivot axis enabling the tailgate to swing-open;
   a rotatable member between the body bracket assembly and the tailgate bracket assembly, the rotatable member pivotally connected to the body bracket assembly about the first pivot axis to form the first rotatable connection and pivotally connected to the tailgate bracket assembly about the second pivot axis to form the second rotatable connection, the rotatable member has a body portion through which the first and second pivot pins extend and a arm extending from body portion, a torsion spring is attached to a distal end of the arm and is engaged by a cam on the tailgate bracket assembly when the tailgate is moved about the first pivot axis.

4. A dual mode hinge assembly for use with a dual mode tailgate, the dual mode hinge assembly comprising:
   a body bracket assembly mounted to a sidewall defining a vehicle load-carrying bed;
   a tailgate bracket assembly mounted to a tailgate that extends across an open edge of the vehicle load-carrying bed;
   a first rotatable connection between the tailgate bracket assembly and the body bracket assembly having a first pivot axis;
   a second rotatable connection between the tailgate bracket assembly and the body bracket assembly having a second pivot axis oriented approximately normal relative to the first pivot axis;
   a rotatable member between the body bracket assembly and the tailgate bracket assembly, the rotatable member pivotally connected to the body bracket assembly about the first pivot axis to form the first rotatable connection and pivotally connected to the tailgate bracket assembly about the second pivot axis to form the second rotatable connection;

a first pivot pin extending through the rotatable member along the first pivot axis and rotatably secured to the body bracket assembly;

a second pivot pin extending through the rotatable member along the second pivot axis and rotatably secured to the tailgate body bracket assembly; and bearings between the first pivot pin and the body bracket assembly and between the second pivot pin and the tailgate bracket assembly.

5. A dual mode hinge assembly for use with a dual mode tailgate, the hinge assembly comprising:

a body bracket mounted to a sidewall defining a vehicle load-carrying bed;

a tailgate bracket mounted to a tailgate that extends across an open end of the vehicle load-carrying bed;

a rotatable member between the body bracket and the tailgate bracket, the rotatable member pivotally connected to the body bracket about a first pivot axis to form a first rotatable connection and pivotally connected to the tailgate bracket about a second pivot axis to form a second rotatable connection;

a first pivot pin extending through the rotatable member along the first pivot axis and rotatably secured to the body bracket; and a second pivot pin extending through the rotatable member along the second pivot asis and rotatably secured to the tailgate body bracket, wherein the body bracket has a U-shape for receiving the rotatable member and supporting the first pivot pin and the tailgate bracket has a U-shape for receiving the rotatable member and supporting the second pivot pin, the rotatable member having a cross-sectional shape that cooperates with the U-shapes of the body bracket and tailgate bracket to limit simultaneous movement of the tailgate about the first and second pivot axes.

6. A dual mode hinge assembly for use with a dual mode tailgate, the dual mode hinge assembly comprising:

a body bracket assembly mounted to a sidewall defining a vehicle load-carrying bed;

a tailgate bracket assembly mounted to a tailgate that extends across an open edge of the vehicle load-carrying bed;

a rotatable member between the body bracket assembly and the tailgate bracket assembly, the rotatable member pivotally connected to the body bracket assembly about a first pivot axis to form a first rotatable connection for opening the tailgate in a flip-down mode and pivotally connected to the tailgate bracket assembly about a second pivot axis to form a second rotatable connection, for opening the tailgate in a swing-open mode;

a first cam on the tailgate bracket assembly; and a torsion spring on the rotatable member positioned to be engaged by the cam when the tailgate is moved about the first pivot axis.

7. The dual mode hinge assembly of claim 6 wherein the cam is rotatably mounted on the tailgate bracket assembly.

8. The dual mode hinge assembly of claim 7 further including:

a second cam rotatably mounted on the tailgate bracket assembly and adapted to engage the torsion spring when the tailgate is moved about the first pivot axis.

9. The dual mode hinge assembly of claim 8 wherein pins are used to rotatably mount the first and second cams to the tailgate bracket assembly.

10. The dual mode hinge assembly of claim 6 wherein the torsion spring is candy-cane shaped, a short portion of the torsion spring is engaged by the first cam and a long portion affixed to the rotatable member.

11. The dual mode hinge assembly of claim 3 wherein the cam is a pair of rotatably mounted cams having cam surfaces, the cam surfaces are shaped such that the engagement between the torsion spring and the cam surfaces urges the tailgate into specific predetermined positions when the tailgate is moved about the first pivot axis.

12. A tailgate assembly adapted to be mounted along an open edge of a vehicle's load-carrying bed wherein the tailgate is able to alternatively pivot about (1) a first axis for movement between a closed position and a fold-open position and (2) a second axis for movement between the closed position and a swing-open position, the tailgate assembly comprising:

a tailgate selectively closing an open end of an associated vehicle load-carrying bed;

a dual mode hinge assembly mounted to the tailgate adjacent a corner of the tailgate formed at an intersection of a bottom edge of the tailgate and a first lateral edge of the tailgate the hinge assembly including a checker for urging the tailgate toward preselected positions when opening the tailgate, the checker including a biasing member and a rotatable can for engaging the biasing member when the tailgate is opened;

a first selectively operable hinge mounted to the tailgate adjacent a corner of the tailgate formed at an intersection of the bottom edge of the tailgate and a second lateral edge of the tailgate, the first selectively operable hinge cooperating with the dual mode hinge assembly to pivotally support the tailgate about the first axis;

a second selectively operable hinge mounted to the tailgate adjacent a corner of the tailgate formed at an intersection of a top edge of the tailgate and the first lateral edge of the tailgate, the second selectively operable hinge cooperating with the dual mode hinge assembly to pivotally support the tailgate about the second axis.

13. A dual mode hinge assembly for use with a dual mode tailgate, the dual mode hinge assembly comprising:

a body bracket assembly mounted to a sidewall defining a vehicle load-carrying bed;

a tailgate bracket assembly mounted to a tailgate that extends across an open edge of the vehicle load-carrying bed;

a rotatable member between the body bracket assembly and the tailgate bracket assembly, the rotatable member pivotally connected to the body bracket assembly and pivotally connected to the tailgate bracket assembly, the tailgate bracket assembly and the rotatable member together moveable relative to the body bracket assembly about a second pivot axis to move the tailgate in a fold-down direction, the tailgate bracket assembly moveable relative to the rotatable member about a second pivot axis to move the tailgate in a swing-open direction, a first pivot pin pivotally connects the rotatable member to the body bracket assembly and a second pivot pin pivotally connects the rotatable member to the tailgate bracket assembly.

14. The dual mode hinge assembly of claim 13 wherein the rotatable member includes a torsion spring that engages a rotatable cam connected to the tailgate bracket assembly when the tailgate bracket assembly is moved relative to the rotatable member about the second pivot axis to move the tailgate in the swing-open direction.

15. The dual mode hinge assembly of claim 13 wherein the rotatable member includes a biasing member and the tailgate bracket assembly includes first and second rotatably mounted cams that engage the biasing member when the tailgate is moved in the swing-open direction.

16. The vehicle load-carrying bed of claim 1 wherein the checker includes a torsion spring and at least one rotatable cam for engagement with the torsion spring when the tailgate is opened in the swing-open direction, the preselected positions determined by the shape of the cam.

17. The vehicle load-carrying bed of claim 2 wherein the preselected positions of the checker are determined by the shape of the cam.

18. The dual mode hinge assembly of claim 3 wherein the cam is rotatably mounted on the tailgate bracket assembly.

19. The dual mode hinge assembly of claim 3 further including:
 a first pivot pin extending through the rotatable member along the first pivot axis and rotatably secured to the body bracket assembly;
 a second pivot pin extending through the rotatable member along the second pivot axis and rotatably secured to the tailgate body bracket assembly; and
 bearings between the first pivot pin and the body bracket assembly and between the second pivot pin and the tailgate bracket assembly.

20. The dual mode hinge assembly of claim 3 wherein the rotatable member has a shape that cooperates with the body bracket and tailgate bracket assembly to prevent simultaneous movement of the tailgate about the first and second pivot axes.

21. The dual mode hinge assembly of claim 4 further including a spring on the rotatable member that engages a cam mounted on the tailgate bracket assembly when the tailgate is opened about the first pivot axis and urges the tailgate into a preselected position.

22. The dual mode hinge assembly of claim 21 wherein the preselected position is one of several positions defined by the cam.

23. The dual mode hinge assembly of claim 5 wherein the rotatable member includes a torsion spring and the tailgate bracket includes a cam, the torsion spring and the cam engageable with one another when the tailgate is opened to urge the tailgate toward a preselected position.

* * * * *

UNITED STATES PATENT AND TRADEMARK OFFICE
CERTIFICATE OF CORRECTION

PATENT NO. : 6,938,941 B2
DATED : September 6, 2005
INVENTOR(S) : Steven Thiele et al.

It is certified that error appears in the above-identified patent and that said Letters Patent is hereby corrected as shown below:

<u>Column 9,</u>
Line 29, "asis" should be -- axis --.

<u>Column 10,</u>
Line 26, "can" should be -- cam --.

Signed and Sealed this

Eighth Day of November, 2005

JON W. DUDAS
*Director of the United States Patent and Trademark Office*